United States Patent [19]

Gordon

[11] 4,419,278
[45] Dec. 6, 1983

[54] PHOTOACTIVE SEMICONDUCTOR MATERIAL USING TRUE SOLID/SOLID SOLUTION MIXED METAL OXIDE

[75] Inventor: Arnold Z. Gordon, Lyndhurst, Ohio

[73] Assignee: Diamond Shamrock Corporation, Dallas, Tex.

[21] Appl. No.: 259,941

[22] Filed: May 4, 1981

[51] Int. Cl.$^3$ .............................................. H01B 1/06
[52] U.S. Cl. ................................. 252/501.1; 429/111; 252/512; 252/513; 252/518; 252/519; 252/520; 252/521; 252/514
[58] Field of Search ...................... 252/501.1, 512, 513, 252/514, 518, 519, 520, 521; 204/290; 429/111

[56] References Cited

U.S. PATENT DOCUMENTS

| | | | |
|---|---|---|---|
| 4,003,817 | 1/1977 | Bianchi et al. | 204/290 F |
| 4,011,149 | 3/1977 | Nozik | 204/129 |
| 4,040,918 | 8/1977 | Johnson et al. | 204/98 |
| 4,061,549 | 12/1977 | Hazelrigg, Jr. et al. | 204/98 |
| 4,061,558 | 12/1977 | Saito et al. | 204/290 F |
| 4,065,377 | 12/1977 | Zöllner | 204/290 F |
| 4,076,611 | 2/1978 | Gray | 252/521 |
| 4,090,933 | 5/1978 | Nozik | 204/129 |
| 4,115,631 | 9/1978 | Deb | 429/111 |
| 4,118,547 | 10/1978 | Witzke et al. | 429/111 |
| 4,127,499 | 11/1978 | Heller et al. | 204/2.1 |
| 4,144,147 | 3/1979 | Jarrett et al. | 204/129 |
| 4,149,173 | 4/1979 | Schmelz et al. | 357/10 |
| 4,167,461 | 9/1979 | Dickson et al. | 204/102 |
| 4,172,925 | 10/1979 | Chen et al. | 429/111 |
| 4,181,593 | 1/1980 | McKinzie et al. | 204/290 |
| 4,181,754 | 1/1980 | McKinzie et al. | 427/74 |
| 4,187,155 | 2/1980 | deNora et al. | 204/67 |
| 4,188,464 | 2/1980 | Adams et al. | 429/210 |
| 4,204,933 | 5/1980 | Barlow et al. | 204/181 N |
| 4,215,155 | 7/1980 | McKinzie et al. | 427/74 |
| 4,215,182 | 7/1980 | Ang et al. | 429/15 |

FOREIGN PATENT DOCUMENTS

| | | |
|---|---|---|
| 2644737 | 4/1978 | Fed. Rep. of Germany . |
| 2312123 | 12/1977 | France . |
| 2410506 | 6/1979 | France . |

OTHER PUBLICATIONS

"Photoelectrolysis of Water with Semiconductors" Tomkiewicz et al., 1979, pp. 20 and 21.
"Semiconductor Electrodes II, Electrochemistry at n-type TiO$_2$ Electrodes in Acetonitrile Solutions", S. N. Frank, J. Am. Chem. Soc. 97:7427 (1975).
"The Chemical Vapor Deposition and Application of Polycrystalline n-type Titanium Dioxide Electrodes of the Photosensitized Electrolysis of Water", K. L. Hardee, J. Electrochem. Soc. 112:739 (1975).
Preparation and Comparison of the Photoelectronic Properties of Sr$_2$No$_2$O$_7$ and Ba$_{0.5}$-N$_6$O$_6$"Hormadaly, Subbarao, Kershaw, Dwight and Wold, Office of Naval Research, Tech. Report No. 6, Contract No. Noool-4-77-C-0387, Task No. NK-359-653 (Aug. 1979).
"The Photoelectrolytes of Water Using Iron Titanate Anodes", Ginley and Butler, J. Appl. Phys., 48, 2019 (1977).
"Preparation and Czochralski, Crystal Growth of the Iron Titanates, FeTiO$_3$, Fe$_2$TiO$_4$, and Fe$_2$TiO$_5$", Ginely and Baughman, Mat. Res. Bull., vol. 11, pp. 1539–1544 (1976).
"Photo-Oxidation of Water at Barium Titanate Electrodes", Kennedy and Frise, Jr., J. Electrochem. Soc. 123, 1683 (1976).
"Energy Conversion in Photoelectrochemical Systems—A. Review", Rajeschwar, Singh and DuBow, Electrochimica Acta, vol. 23, pp. 1117–1144.
"Solar Energy Conversion by Photoelectrochemical Processes" R. Memming, Electrochimica Acta, vol. 25, pp. 77–88.

Primary Examiner—Josephine Barr
Attorney, Agent, or Firm—Bruce E. Harang

[57] ABSTRACT

A photoactive semiconductor mixed metal oxide material comprising a true solid/solid solution of a specific composition of elemental metals and/or metal non-oxide compounds which are soluble or can be made soluble and which are then fired to produce a true solid/solid solution of metal oxide compounds providing an effective band gap and/or optical response optimally matched to the part of the energy spectrum desired for a particular utilization and a method of producing said true solid/solid solution photoactive semiconductor mixed metal oxide material is disclosed.

30 Claims, 5 Drawing Figures

SrTi$_{1-X}$b$_X$O$_3$ UNIT CELL $a_0$ (Å)

STRONTIUM ION — OXIDE ION — MEAN 4+ CHROMOPHORIC ION

PHOTOACTIVE SEMICONDUCTOR MATERIAL USING TRUE SOLID/SOLID SOLUTION MIXED METAL OXIDE

BACKGROUND OF THE INVENTION

This invention relates to photoactive semiconductor mixed metal oxide materials suitable for use as electrodes in electrochemical cells, photoconductors, and in "photoassisted" electrochemical reactions utilizing true solid/solid solutions of diverse metal oxides to produce the photoactive semi-conductor mixed metal oxide material. A method of producing said true solid/solid solution type of photoactive semiconductor mixed metal oxide material is also disclosed.

There has been considerable recent interest in the application of photoactive semiconductor electrodes to the electrolysis of water and to the direct conversion of solar energy to electrical, fuel, chemicals and/or chemical energy. The uses of such electrodes have been generalized as reductionoxidation reactions in addition to the electrolysis of water. Chemical reactions resulting from photoactive semiconductor electrodes can be carried out at potentials much lower than otherwise required utilizing light as an additional driving force for these reactions. Such processes may be termed "photoassisted" rather than photocatalyzed reactions. There are, however, two major obstacles which must be overcome in order to make direct conversion of solar energy to electrical, fuel, chemicals and/or chemical energy or the electrolysis of water, a viable commercial process both on the industrial level and the consumer level. The first of these two problems is reducing the cost of producing the desired end result, i.e., the electrolysis of water or direct conversion of solar energy to electrical, fuel, chemicals and/or chemical energy. The second problem is producing a system that has a long life in actual use. An acceptable life span is generally thought to be 20 years. Oxides of niobium, tantalum, titanium, and tin tend to answer both the above problems and do exhibit the necessary photochemical response. It has been long known, for example, that titanium dioxide ($TiO_2$) fills both of the requirements of long life and economical production of electrodes for use in the electrolysis of water or the direct conversion of solar to chemical or electrical energy. However, titanium dioxide by itself has an extremely large (relative to where the energy of the solar spectrum falls) "band gap." The term "band gap" as herein and hereafter used means the minimum amount of energy needed to raise an electron in a valence band to an energy level in a conduction band. This band gap is too large for use with approximately 97 percent of the available solar energy, i.e., $TiO_2$ absorbs wave lengths that are shorter than about 400 nanometers, and about 97 percent of the terrestrial solar spectrum has wave lengths that are longer than 400 nanometers. Titanium dioxide does have an additional advantage of being a material which is not toxic to the general environment. Thus, it does not have any of the generally harmful effects to the environment commonly associated with materials having a natural band gap more closely attuned to the solar spectrum such as, for example, cadmium selemide (CdSe) and gallium arsenide (GaAs).

It is known that electrodes fabricated from, for example, single crystals of pure titanium dioxide, doped single crystals of titanium dioxide, or polycrystalline titanium dioxide which may or may not be deposited on an appropriate substrate can be used as photoelectrodes. Titanium dioxide has a band gap which is unacceptably inefficient of about 3.0 eV. This band gap results in a maximum terrestrial power conversion efficiency of only about 1 or 2 percent.

To form electrically conductive semiconductor material, the titanium dioxide may be typically treated by reduction with hydrogen or reduction in a vacuum. It is theorized that such treatment produces a material with oxygen latices deficiencies in the titanium dioxide crystal, with these latice defect sites contributing to the semiconductor properties. This partially reduced material can be characterized by the general formula $TiO_{(2-x)}$, where x takes on a value of between 0 and 1. Because of the great possibilities which these electrodes have for conversion of solar energy to electrical or chemical energy, a number of studies have been directed to methods of fabricating electrodes which make such conversions more efficient. In previously described uses of n-type titanium dioxide semiconductor electrodes, it has generally been the practice to use electrodes formed from single crystals of $TiO_2$ or a reduced polycrystalline $TiO_2$.

The technique of producing single crystal, photoactive $TiO_2$ electrodes is described, for example, by S. N. Frank et al in "Semiconductor Electrodes II, Electrochemistry at n-type $TiO_2$ Electrodes in Acetonitrile Solutions," J. Am. Chem. Soc. 97:7427 (1975). Polycrystalline titanium dioxide electrodes produced by chemical vapor deposition techniques are described, for example, by K. L. Hardee et al in "The Chemical Vapor Deposition and Application of Polycrystalline n-type Titanium Dioxide Electrodes of the Photosensitized Electrolysis of Water," J. Electrochem. Soc. 112:739 (1975).

Single crystal $TiO_2$ electrodes or doped signal crystal $TiO_2$ electrodes are costly and difficult to produce. On the other hand, polycrystalline electrodes which utilize $TiO_2$ as the photoactive semiconductor material are less difficult and less costly to produce but are still limited in their spectral response to wave lengths of about 400 nanometers and shorter.

Another method of trying to alter the spectral response of the $TiO_2$ electrodes involves making physical mixtures of titanium dioxide and other compounds with optical absorption loser to the desired optimum of the terrestrial solar spectrum, see for example, U.S. Pat. Nos. 4,181,593 and 4,181,754. Said U.S. patents teach physical mixtures which are not homogeneous mixtures at the ionic or molecular level. The nonhomogeneous mixtures are limited to titanium dioxide and other metal oxides which have a chemical oxidation state other than +4 which are sintered and placed on a substrate. While this teaching does produce an electrode, it does not produce an electrode which has the necessary efficiency to make it economically feasible in the market place. Additionally, the above-identified U.S. Pat. No. 4,181,593 teaches an optical absorption adjustment of only 70 namometers at best, i.e., up to about 470 nanometers. This is still far from the optimum wavelength of approximately 800 nanometers. Yet another method used to modify $TiO_2$ has been what is called "dying" of the $TiO_2$ either supported by another substrate or unsupported. These systems use a film layering over the $TiO_2$ of a material, frequently organic, which absorbs solar energy more efficiently than $TiO_2$ alone. These systems, however, are deficient in a number of areas.

First, they do not provide the longevity necessary for an economical system in the market place. Secondly, they are not efficient.

It is therefore an object of the present invention to provide a photoactive semiconductor mixed metal oxide material suitable for use, for example, as electrodes, comprising true solid/solid solutions of diverse metal oxides which are simple and inexpensive to produce, having an optical absorption which may be optimized to the solar or other spectra and which produce the necessary longevity. These and other advantages will become apparent in the following description of the instant invention.

SUMMARY OF THE INVENTION

It has now been found that photoactive semiconductor mixed metal oxide material can be readily and economically prepared having enhanced response to wave lengths of light longer than about 400 nanometers, having satisfactorily long life, an extremely high resistance to attack and which do not need elaborate and/or costly post-production steps to realize these advantages.

Applicant's approach is to shift the mixed metal oxide materials optical absorption to be more closely attuned to the specific application, for example, the terrestrial solar spectrum, i.e., an optical absorption edge of approximately 1.4 eV.

It has been found that the mixed metal oxide compounds in the form of true solid/solid solutions produces photoactive semiconductor material suitable for use in photoelectrochemical cells and/or photovoltaic cells, as electrodes, having high efficiency, long life and which are economically suitable for the market place. Electrodes utilizing the present invention avoid the cost and/or difficulties encountered in fabricating doped single crystal electrodes while functioning with good efficiency.

The photoactive semiconductor mixed metal oxide materials of the instant invention are in fact true solid/solid solutions, i.e., by this it is meant that they are a uniformly dispersed homogeneous mixture, at the molecular or ionic level, of one or more substances (the solute) in one or more other substances (the solvent) analogous, for example, to the more commonly thought of solution types such as ethanol in water, a liquid/liquid true solution or table salt in water a solid/liquid true solution.

The present invention is directed broadly to photoactive semiconductor mixed metal oxide materials containing metal components all of which are derived from precursor substances selected from the group consisting of elemental metals, non-oxide metal compounds, and mixtures thereof; said mixed metal oxide material corresponding to the formula $A_r^{va}M_y^{vm}O_2^{-2}$, where said formula represents the stoichiometry of the basic repeating unit lattice cell; where M is the combination of component (a) metal and component (b) metal; A, when present, is at least one different metal which does not substantially alter the optical absorption accruing from M in the above formula; O represents oxygen, said formula being further characterized in that r,y,z,va, and vm are defined by the relationship $va(r)+vm(y)=2z$ wherein r equals a value of from 0 to 2, inclusive, y is from 1 to 2, inclusive, z is from 1 to 7, inclusive, va equals the positive valence of A, vm equals the positive mean valence of M and the valence of oxygen is $-2$; and wherein all said metal components of said formula are selected from the group consisting of boron, aluminum, tin, lead, the transition metals of families 1b through 7b, inclusive, and 8 of the periodic table of elements and the lanthanide series; wherein M in the above formula comprises: (a) 50 to 99.9 mole percent, based on the total metals mole fraction, of one or more component (a) metals; and (b) 0.1 to 50 mole percent, based on the total metal mole fraction, of one or more component (b) metals; with the proviso that said component (b) metals are different than said component (a) metals and with the further proviso that said component (a) metals, when in comparable oxide form, have a larger band gap than said component (b) metals, when said component (b) metals are in their comparable oxide form. This true solid/solid solution provides an effective band gap and/or optical response optimally matched to the part of the energy spectrum desired for a particular utilization. The instant invention effectively shifts the resulting photoactive semiconductor mixed metal oxide materials optical absorption.

DETAILED DESCRIPTION

Figure 1:
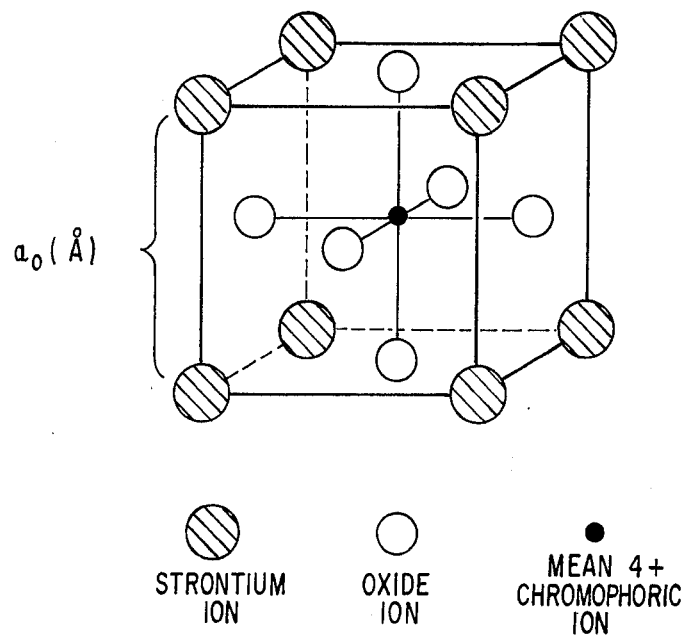
FIG. 1 is an idealized representation of a single unit cell of true solid/solid solution photoactive semiconductor mixed metal oxide material of the formula $SrTi_{1-x}b_xO_3$.

True solid/solid solution photoactive semiconductor mixed metal oxide materials according to the instant invention provide improved spectral response and efficiency by combining at least two metal components all of which are derived from precursor substances selected from the group consisting of elemental metals, non-oxide metal compounds, and mixtures thereof. For convenience, two of the metal component precursors, and thus also the metals themselves (when referring to "M" as discussed hereinbelow), are herein grouped together as components (a) and (b). Component (a) precursors may be defined as non-oxide precursor substances, which in their oxide form, each have a band gap larger in size than any component (b) precursor, when subcomponent (b) precursor is in comparable oxide form. Stated the other way, the one or more component (b) precursors may then be defined as non-oxide precursor substances each of which in its oxide form has a narrower band gap than any component (a) in comparable oxide form. Components (a) and (b) are combined to form a true solid/solid solution. Generally, component (a) and (b) precursors being non-oxides are elemental metals, non-oxide metal compounds or organometallic compounds as well as mixtures thereof, with the foregoing compounds containing, in addition to the metallic elements, other elements which are not exclusively oxygen. Suitable components (a) and (b) are those components containing metals selected from a group consisting of boron, aluminum, tin, lead, the lanthanide series and the transition metals. (As used throughout the specification and claims, the term "transition metal" means any metallic element of groups 1b, 2b, 3b, 4b, 5b, 6b, 7b, or 8 of the periodic table of elements; and lanthanide series means any one of the elements numbers 58 through 71, inclusive, as they appear on pages 448 and 449 of the *Handbook of Chemistry and Physics*, Chemical Rubber Publishing Company, Cleveland, Ohio (1963)). More particularly, the metals of the components (a) and (b) precursors used to produce the true solid/solid solution photoactive semiconductor mixed metal oxide material of the instant invention are such that can result in the preparation of mixed metal oxide materials, the totality of which materials can be represented by the general formula $A_r{}^{va}M_y{}^{vm}O_z$. In the formula, M is a combination of component (a) metal and component (b) metal and A when present is at least one different metal which does not effectively and/or substantially alter the optical absorption in the electromagnetic region of interest accruing from M and O represents oxygen; further characterized in that r, y, z, va and vm are defined by the relationship $(va)(r)+(vm)(y)=2z$ wherein r is from 0-2, inclusive, y is from 1-2, inclusive, and z is from 1-7, inclusive, va equals the positive valence of A, vm equals the positive mean valence of M and the valence of oxygen is $-2$.

The A in the above general formula may be a single metal or A may be a combination of up to three different metals. In the formula, A may be any substantially, optically passive metallic ion (as defined below), such as from zinc, strontium or lanthanide metals, wherein the lanthanide metals are any one of the elements Nos. 58 through 71, inclusive. The preferred metal or metals A are strontium, zinc or one or more of the lanthanides.

In the above general formula, M is a combination of two or four different metals, preferably two different metals. The combination of metals is derived, as described above so as to have at least one larger band gap and at least one narrower band gap metal compound. As an example, titanium and ruthenium are suitable, since $TiO_2$ has a larger band gap than $RuO_2$; so titanium is the component (a) metal while ruthenium serves as the component (b) metal.

It is understood that the above formula is used to represent the stoichiometry of the basic repeating unit lattice cell, so the values of r, y and z are often described in fractional notation such as, for example, $SrTi_{.67}Ru_{.33}O_3$. This type of notation represents the stoichiometry of the basic repeating unit lattice cell. This type of notation also allows for the most simple illustrative cell structure to be used to describe the material in question (see, for example, FIG. 1). Further discussion of how this type of notation is used can be found in, for example, *Structure, Properties and Preparation of Perovskite-Type Compounds*, Fransis S. Galasso, Pergamer Press, 1969. However, it is also understood that the formula $Sr_3Ti_2RuO_9$ is an equivalent expression of exactly the same compound. Thus, applicant realizes that using the more classical whole number formula format would result in values above those specified by applicant in his instant invention while in fact describing suitable compounds. Examples of suitable values of r, y and z and examples of the resulting formulae are, for example, $r=0$, $y=1$, $z=2$ and the final oxide compound corresponds to the formula $MO_2$; $r=1$, $y=1$, $z=3$ and the final oxide compound corresponds to the formula $AMO_3$; $r=2$, $y=2$, $z=7$ and the final oxide compound corresponds to the formula $A_2M_2O_7$; $r=0$, $y=2$, $z=3$ and the final oxide compound corresponds to the formula $M_2O_3$; $r=0$, $y=1$, $z=1$ and the final oxide compound corresponds to the formula $MO$. Other compounds having other final oxide forms are also possible. Some specific examples are, for example, $(Pd,Ca)O$ representing the form $MO$; $(Ti,V)O_2$ representing the form $MO_2$; $(Fe,Al)_2O_3$ representing the form $M_2O_3$; $K(Ta,Nb)O_3$ representing the form $AMO_3$ and $La_2(Ti,Ru)_2O_7$ representing the form $A_2M_2O_7$.

FIG. 1 is an idealized representation of a single unit cell of a photoactive semiconductor mixed metal oxide material of the instant invention having the general form of $SrTi_{1-x}b_xO_3$. Shown is an idealized single unit cell of said material in the form of a cube having a strontium ion at each outer corner, an oxide ion on each of the six cube faces and a single ion in the center of the cube representing Ti and (b). It is understood that the choice of whether the center ion is Ti or (b) depends on the particular unit cell (if one could be separated from the whole) chosen. The size of the unit cell is denoted by $a_o$ representing the distance (in angstroms, A) along an edge of said unit cell. It is further understood that the probability of finding a Ti ion or an (b) ion in a given particular unit cell depends on the particular ratio of Ti to (b) in the particular composition of interest.

Figure 2:
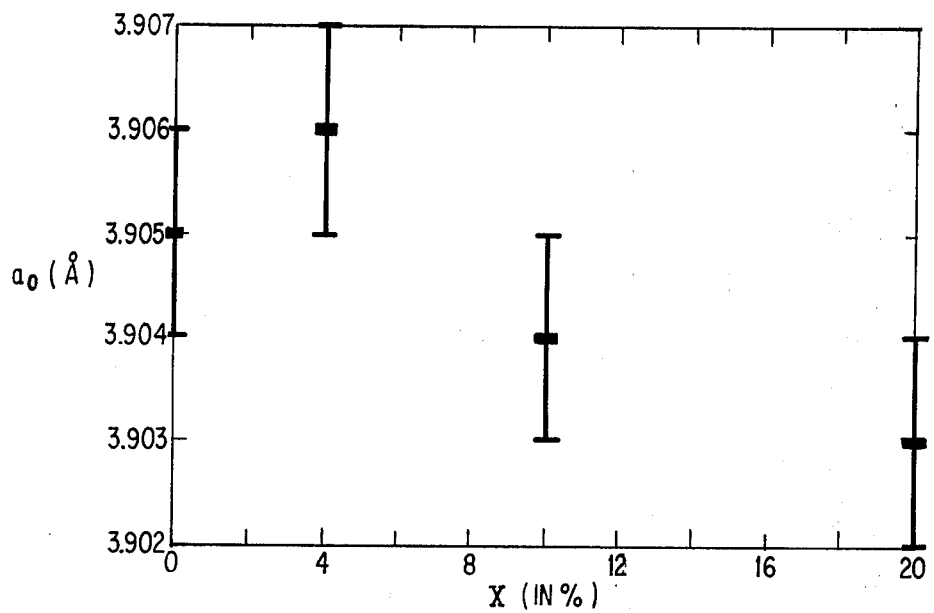
FIG. 2 is a graphic representation of the lattice parameter versus the rhodium content of a true solid/solid solution photoactive semiconductor mixed metal oxide of the formula $SrTi_{1-x}Rh_xO_3$. Brackets are used to indicate the estimated error for each point on the graph.

FIG. 2 is a graphic representation of the change in the lattice parameter (the length of an edge of a single unit cell in angstroms) at several different ratios of Rh content to Ti content in a mixed metal oxide of the general formula $SrTi_{1-x}Rh_xO_3$. The values of "x" in the figure are percent Rh (based on metal mole fraction of Rh in M of the general formula $A_R{}^{va}M_y{}^{vm}O_z{}^{-2}$).

Figure 3:
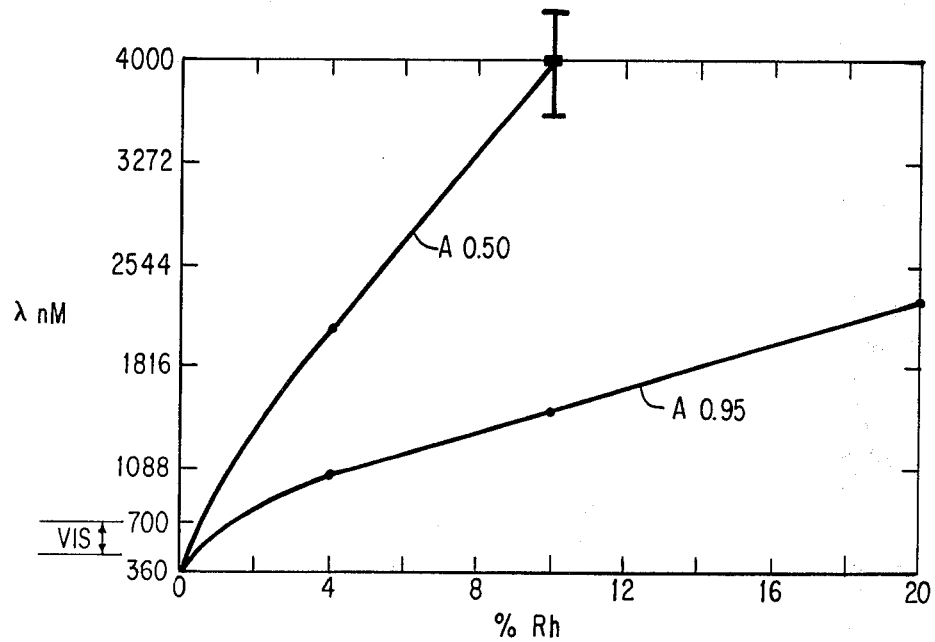
FIG. 3 is a graphic representation of the absorption edge versus rhodium content of a true solid/solid solution photoactive semiconductor mixed metal oxide material of the formula $SrTi_{1-x}Rh_xO_3$ at 50 percent absorption (the bracketed value being an extrapolated value) and at 95 percent absorption.
Figure 4:
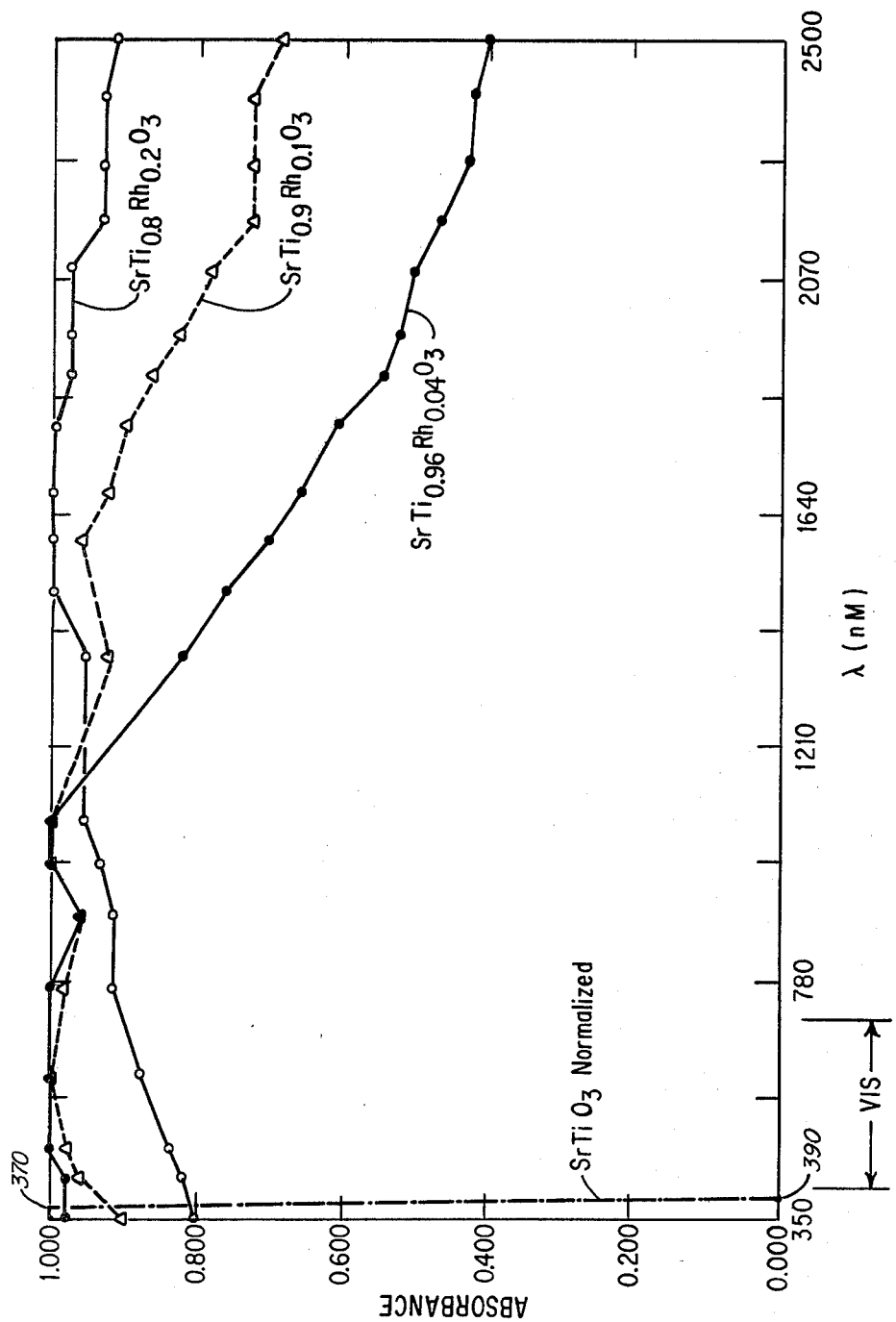
FIG. 4 is a graphic representation of changing the absorption edge (plotted as absorbance vs. wavelength) by changing the amounts of rhodium in the true solid/solid solution photoactive semiconductor mixed metal oxide material of the general formula $SrTi_{1-x}Rh_xO_3$.
Figure 5:
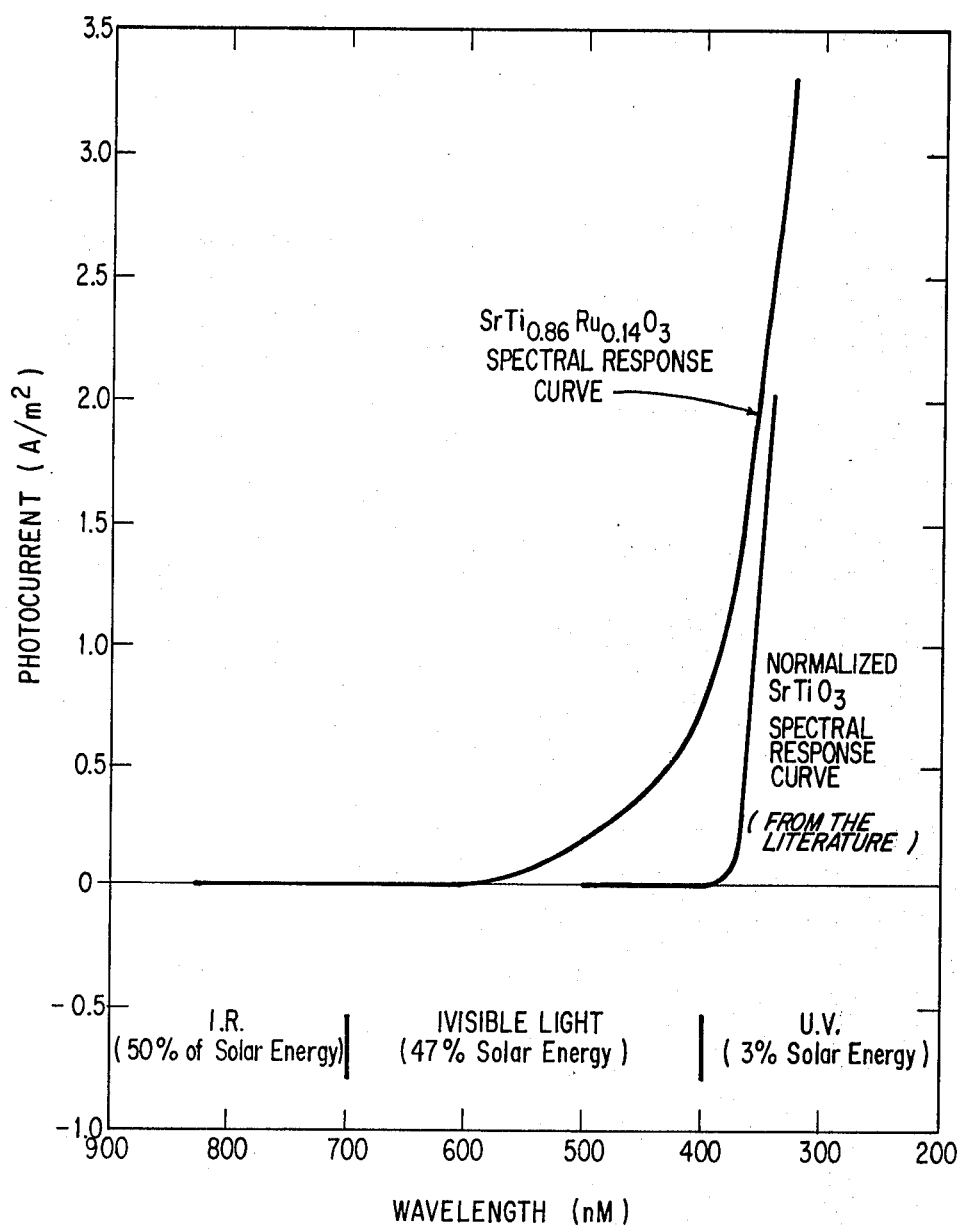
FIG. 5 is a graphic representation of the spectral response of $SrTiO_3$ compared to the spectral response of a true solid/solid solution photoactive semiconductor mixed metal oxide material of the formula $SrTi_{.86}Ru_{.14}O_3$. The $SrTiO_3$ curve is normalized from data presented in "Fundamental Absorption Edge of $SrTiO_3$," Redfield, D. and Burke, William J.; Physical Review B, Vol. 6, No. 8, Oct. 15, 1972.

FIGS. 3 through 5 are discussed hereinafter in greater detail in connection with the examples.

Representative component (a) precursors may be any elemental metal and/or other metal non-oxide compound which is soluble or can be made soluble of aluminum, boron, tin, lead, certain lanthanides or the transition elements which form true solid/solid solutions of the form $MO_2$ such as zirconium and niobium. Component (a) precursors may also be an elemental metal and/or other metal non-oxide compound which is soluble or can be made soluble of boron, aluminum, tin, lead, certain lanthanides or the transition metals which form true solid/solid solutions in the form $AMO_3$ such as, for example, titanium. Additionally, component (a) precursors may be an elemental metal and/or other metal non-oxide compound which is soluble or can be made soluble of aluminum, boron, tin, lead, certain lanthanides or the transition metals producing a material having the general formula $A_r{}^{va}M_y{}^{vm}O_z{}^{-2}$ (as defined above) wherein M is a mixture of a transition metal or tin or lead plus one or more other metals of boron, aluminum, tin, lead, certain lanthanides or transition metals. By the term "certain lanthanides" used herein to refer to component (a) metals is meant those lanthanides which have a band gap (as defined above) which is larger than any component (b). Component (a) comprises 50 to 99.9 percent based on the total metals mole fraction of M. Preferred component (a) precursors are non-oxide compounds of aluminum, niobium, lanthanum, tantalum, tin, titanium and zirconium, most preferably titanium. Some specific examples are titanium ethoxide, diethyl tin dibromide, zirconyl iodide and lanthanum chloride.

Metals of component (b) may be any one or more of the transition metals in families 1b through 7b and group 8 and/or of the lanthanide series elements 58 through 71, inclusive, and/or boron, aluminum, tin and lead as set out in the periodic table of elements, with the restriction that all component (b) metals must be different than component (a) metals. Component (b) comprises 0.1 to 50 percent based on the total metals mole fraction of M. Preferred component (b) precursors are those of the non-oxide metal compounds of iridium, manganese, chromium, iron, vanadium, platinum, rhodium and ruthenium, most preferably rhodium and ruthenium. Specific compounds suitable as component (b) precursors include, for example, ferrous sulfate, manganous acetate, ruthenium trichloride, rhodium nitrate and chloroplatinic acid.

Examples of preferred embodiments from which M may be derived are, for example, a non-oxide compound from the group niobium, lanthanum, tantalum, tin, titanium and zirconium one or more of which is used together with at least one non-oxide metal compound of the group rhodium, ruthenium, iridium, manganese, chromium, iron, vanadium and platinum. Other combinations of non-oxide metal compounds selected from the group boron, aluminum, tin, lead, the lanthanide series and the transition metals are also suitable. Presently preferred compounds from which M may be derived are those consisting of two non-oxide metal compounds, one selected from the group niobium, lanthanum, tantalum, tin, titanium and zirconium and the other selected from the group rhodium and ruthenium. Specific examples of M are titanium-ruthenium, titanium-rhodium and zirconium-chromium.

The A in the above general formula may be any substantially, optically passive metal (as defined below) such as, for example, zinc, strontium or one of the lanthanide series metals. It is to be understood that the materials used as A must meet the same requirements as precursors components (a) and (b) as far as composition and solubility. This is examplified, for example, in Example 1 and the illustrative embodiment. Photoactive semiconductor mixed metal oxide materials now produced may be used for both n-type and p-type photoactive semiconductor materials; alternatively, the p-type material when used in a n-p solar cell may be a material such as PdO, CoO, or one of the various $Ln_2O_3$ (lanthanide series oxide) phases and/or solid/solid solutions of said $Ln_2O_3$ materials.

The method of producing the photoactive semiconductor mixed metal oxide material advantageously starts with reagent grade or preferably a purer grade chemical. It is of particular importance that the individual starting compounds be of at least reagent grade, so as not to contain deleterious amounts, with the exception noted below, of metals other than the metal or metals of interest. This is generally referred to herein, for convenience, as using metals or metal compounds in purified form. Contamination by nonmetallic materials such as carbonate, nitrate, organic matter and the like is unimportant as they will be burned off during the subsequent firing step of the instant process. Finally, it should be pointed out, in some cases, a third or more metal which does not effectively and/or substantially alter the optical absorption in the region of interest is needed to make the formation of a true solid/solid solution possible. Thus, for example, titanium metal compounds and ruthenium metal compounds by themselves do not readily tend to form true solid/solid solutions of the form $MO_2$ (rutile type symmetry). However, in the presence of additional metal or metals (the A in the above general formula) such as strontium, they are highly prone to producing true solid/solid solutions of the form, for example, $AMO_3$ (perovskite type symmetries) where A represents strontium and M is the sum of titanium and rhodium. By substantially, optically passive third metal or metals is meant a metal or metals which, when used, does not effectively and/or substantially alter the optical absorption in the region of interest accruing from M. The preferred substantially, optically passive metal ions are strontium and lanthanum.

Applicant's general method of making the true solid/solid solution photoactive semiconductor mixed metal oxide material of the instant invention is as follows: (1) dissolving at least two different non-oxide metal ion precursors in liquid solvent; (II) separating said liquid solvent from said solution of step (I) by a separation means leaving an intimately blended solid in non-oxide form; and (III) converting said intimately blended solid of step (II) to a true solid/solid solution mixed metal oxide by firing; thereby producing said photoactive semiconductor mixed metal oxide material. It is understood that in performing step (I) it may be necessary or advantageous to add additional solvent and/or add a quantity of different solvent after initial dissolution of one or more of the non-oxide metal ion precursors.

By the term "soluble" as used herein when referring to component (a) and (b) precursors is meant that such are generally easily dissolved in the solvent systems, generally with only simple mixing and without deleterious side effects such as solids precipitation or phase separations. By the term "being made soluble," as such used herein, is meant that the component (a) and (b) precursors can be dissolved in solvent useful in the instant invention (and described in greater detail below), but such dissolution must be accomplished by special techniques to guard against deleterious phenomena such as phase separation or precipitation. A particular special technique is discussed hereinbelow in the examples. It is also understood that any component A precursor, if used, must also be "soluble" or be capable of "being made soluble" as described above. Thus, for example, precursors such as $SrCO_3$, as an A precursor, $RhCl_3$, as a component (b) precursor and $Ti(C_2H_5O)_4$, as a component (a) precursor are suitable. However, a compound such as $TiB_2$ is not suitable as it is not "soluble" in solvents or solvent systems as discussed hereinbelow, nor can it be "made soluble" by any known special technique.

For purposes of clarity, a specific preferred embodiment will be used to illustrate the method of making said true solid/solid solution semiconductor mixed metal oxide material of the instant invention. However, this preferred specific embodiment is in no way limiting nor is it the only possible method of producing said true solid/solid photoactive semiconductor mixed metal oxide material. This particular preferred embodiment is as follows: (1) titanium ethoxide $Ti(C_2H_5O)_4$ (component (a) precursor) and rhodium trichloride $(RhCL_3)\cdot 3H_2O$ (component (b) precursor) and strontium carbonate $SrCO_3$ as the A precursor, all being non-oxide metal ion precursors are dissolved in aqueous HBr (solvent) to prevent the forming of a precipitate of $TiO_2$ thus producing a true solid/liquid solution; (2) methanol and water, used in combination as additional solvent, are added to produce a more dilute true solid/liquid solution; (3) all solvent is removed by freeze-drying said true solid/liquid solution using liquid nitrogen as the refrigerant causing said solvent to sublimate, leaving an intimate intermediate composition. Finally as a step (4) said intimate composition is then fired. This results in a true solid/solid solution of $SrTi_{x-1}Rh_xO_3$, i.e., mixed metal oxides useful for the instant invention. After cooling, they are rendered the appropriate size powder, advantageously to a size of from 0.1-200 microns for efficient use as a true solid/solid solution photoactive semiconductor mixed metal oxide material. The making of a powder form of the photoactive semiconductor mixed metal oxide materials can be accomplished by comminuting using any known dry comminuting technique and as, for example, grinding in a ball mill. This powder may be used, using generally known methods in the art, as the film of a film electrode or in bulk as a bulk electrode.

Alternative systems of freeze-drying can be used, e.g., the use of an alcohol or a ketone and dry ice as the refrigerant in place of liquid nitrogen.

An alternative to freeze drying but less preferred method of separating said solvent (in step 2) is to simultaneously precipitate the metallic substituents of the solution in finely-divided form by adding a precipitating agent to said solution of step 1. Examples of suitable precipitating agents are, for example, ammonium, aqueous ammonia, ammonium carbonate, ammonium bicarbonate, aqueous solutions of ammonium carbonate, aqueous solutions of ammonium bicarbonate, 8-hydroxy-quinoline, hydrogen sulfide, and mixtures thereof.

Examples of suitable solvents include, for example, combinations of mineral acids or acetic acid with polar liquid mediums. The mineral acids and/or acetic acid may be used in combination. Representative mineral acids are hydrochloric acid, nitric acid, sulfuric acid, phosphoric acid, hydrobromic acid, perchloric acid, nitrous acid and sulfurous acid. The presently preferred acids are hydrochloric acid and hydrobromic acid. Suitable polar liquid mediums are, for example, water and alcohols, such as ethanol and methanol. However, it is understood that other known polar liquids are suitable and in certain instances polar liquids such as ketones, ethers, etc., are preferred. Presently preferred is water because of its low cost, availability and ease of handling.

Presently the area of greatest interest is in optimizing photoactive semiconductor material (having good longevity and resistance to corrosion) to the terrestrial solar spectrum. It is also possible, however, to use the photoactive semiconductor mixed metal oxide materials of the instant invention optimized to other sections of the electromagnetic spectrum. Thus, the photoactive semiconductor mixed metal oxide material may be optimized to the ultraviolet region of the electromagnetic spectrum and therefore be an excellent ultraviolet detector. An example of this type of semiconductor material is one of the general formula $SrTi_{1-x}Zr_xO_3$ wherein 0 is less than x is greater than 1. Another example of optimization other than to the terrestrial solar spectrum is, for example, a semiconductor material following the instant invention consisting of $SrTi_{1-x}Rh_xO_3$ where 0 is less than x is greater than 1. This particular true solid/solid solution semiconductor mixed metal oxide material has a band gap optimized to the infrared region of the electromagnetic spectrum and therefore makes an excellent infrared detector. These and many other specific optimization regions along the electromagnetic spectrum are possible using the instant invention.

The term "firing" as used throughout the specification and claims means the controlled heating or annealing of the material. The controls include the temperature range, time at final temperature, cool down rate, rate of temperature increase, atmosphere used and flow rate of the atmosphere. Generally the temperatures used of from 20° C. to 1600° C. and the rate of temperature increase if from 50° C. to 200° C. per hour. The final temperature is generally held from 1 hour to 24 hours. The cool down rate generally ranges from 50° C. to 200° C. per hour. The atmospheres used are, for example, air, inert gas, hydrogen, and mixtures thereof. The flow rates are generally in the range of 1 ml/min to 5 l per minute.

Additionally, the photoactive semiconductor mixed metal oxide materials of instant invention may be further altered as to their electrical and/or optical properties with dopants, procedures and treatments known and commonly used in the art. They include, for example, laser annealing, reduction and/or oxidize atmosphere annealing, and doping.

The following examples serve to illustrate the product and the process of the present invention without restricting it in any way. In the examples, all quantities quoted represent parts by weight or percent by weight, unless otherwise indicated.

EXAMPLE 1

Solid/solid solution mixed metal oxides useful as photoactive semiconductor mixed metal oxide materials of the formula $SrTi_{1-x}Rh_xO_3$ were prepared as follows:

Strontium/Titanium Stock Solution 147.6 g (1 mole) of $SrCO_3$ (reagent grade) was dissolved in approximately 600 mls of a solvent solution having a ratio (vol/vol) of 1 part concentrated aqueous HBr to 4 parts deionized water. When dissolution of the $SrCO_3$ was complete, 227.9 g (1 mole) of $Ti(C_2H_5O)_4$ (reagent grade) was added and mixed until complete dissolution, enough additional solvent solution was added to make 1 liter. A clear, yellow solution which keeps for 6 to 7 days at room temperature resulted. It is important to dissolve the $SrCO_3$ in most of the solvent solution first to help keep the $Ti(C_2H_5O)_4$ from precipitating the Ti out as $TiO_2$ immediately.

Strontium/Rhodium Stock Solution 1.84 g (0.0125 mole) of $SrCO_3$ (puratronic grade) and 3.29 g (0.0125 mole) of $RhCl_3\cdot 3H_2O$ (reagent grade) was dissolved and diluted to 1 liter volume in a solvent solution having a ratio (vol/vol) of 1 part concentrated aqueous HBr, 1 part isopropyl alcohol and 6 parts deionized water. The resulting solution was stored in a freezer at −10° C. This solution seems to store indefinitely at this temperature. Inductively coupled plasma analysis confirmed a Sr to Rh ratio of 1:1.

Five solid/solid solution mixed metal oxides useful as photoactive semiconductor mixed metal oxide materials, and each with differing amounts of Ti and Rh as shown in Table 1 were prepared by (a) intimately mixing the appropriate amounts of the Strontium-Rhodium and Strontium-Titanium solutions and (b) precipitating the metals by adding a solution containing 150 g of $NH_4HCO_3$, 80 ml of aqueous concentrated $NH_3$ and 100 ml of deionized water. The resulting precipitate containing solution was centrifuged in an International Equipment Co. Model EXD centrifuge at a setting of 50 and the resulting supernatant removed by decanting. The precipitates were placed in alumina crucible with lids and were fired in a Blue "M" box-type muffle furnace to approximately 600° to 800° C., the temperature of the furnace being raised at a rate of about 100° C./hour in an air atmosphere. The resulting solid/solid solution mixed metal oxides, in the form of a finely divided precipatate cake, were allowed to cool and were stored in polyethylene bottles.

TABLE 1

| Sample No. | Stock Solution Sr—Ti (ml) | Stock Solution Sr—Rh (ml) | x (%)* |
|---|---|---|---|
| 1a | 60 | 240 | 4.8 |
| 1b | 200 | 180 | 1.1 |
| 1c | 200 | 120 | 0.74 |
| 1d | 200 | 90 | 0.56 |
| 1e | 200 | 45 | 0.28 |

*The value of x is a nominal value which, due to a number of possible loss mechanisms (i.e., metal staying in solution, precipitate too fine to bring down during centrifuging, vaporization, etc.), may be altered as to the actual final metal mole ratio.

EXAMPLE 2

Photoactive semiconductor materials of the formula $SrTi_{1-x}Rh_xO_3$ were prepared as follows:

Strontium/Titanium Stock Solution 73.8 g (½ mole) of $SrCO_3$ (reagent grade) was dissolved in approximately 600 ml of a solvent solution having a ratio (vol/vol) of 1 part concentrated aqueous HBr to 4 parts deionized water. When dissolution of the $SrCO_3$ was complete, 113.95 g (½ mole) of $Ti(C_2H_5O)_4$ (reagent grade) was added and mixed until complete dissolution, enough additional solvent solution was added to make 1 liter.

Three solid/solid solution photoactive semiconductor mixed metal oxide materials with differing amounts of Ti and Rh, as shown in Table 2, were prepared by (a) intimately mixing the appropriate amounts of the strontium-titanium stock solution of Example 2 with appropriate amounts of the strontium-rhodium stock solution of Example 1 and (b) precipitating the metals by adding a solution containing 150 g of $NH_4HCO_3$, 80 ml of aqueous concentrated $NH_3$ and 100 ml of deionized water. The resulting precipitate containing solution was centrifuged in an International Equipment Co. Model EXD centrifuge at a setting of 50 for approximately 20 minutes, and the supernatant was then removed by decanting. The remaining precipitate cake was desicated at about 95° C. under vacuum for 24 to 72 hours. The cake was placed in a COORS porcelain crucible and was then annealed in air in a Blue "M" box-type muffle furnace for approximately 10 hours at about 600° C., cooled and stored in a polyethylene bottle. These materials were then placed in a platinum foil cup, pressed in a hydraulic press and then fired in a Deltec Horizontal 1½" OD tube furnace using commercial 99.8 percent $Al_2O_3$ 1½" OD by 1 meter tubes from Coors Porcelain Co. in an oxygen atmosphere created by passing of 200 cc/min $O_2$ gas through the furnace. The temperature was raised from room temperature at a rate of about 200° C./24 hours and then held at 1650° C. for approximately 2 hours. The materials were then cooled at a rate of approximately 400° C./hour in an $O_2$ atmosphere resulting in a sintered powder.

TABLE 2

| Sample No. | Stock Solution Sr—Ti (ml) | Stock Solution Sr—Rh (ml) | x (%)* |
|---|---|---|---|
| 2a | 400 | 40 | 0.25 |
| 2b | 400 | 16 | 0.10 |
| 2c | 200 | 0 | 0 |

*The value of x is a nominal value which, due to a number of possible loss mechanisms (i.e., metal staying in solution, vaporization, etc.), may be altered as to the actual final metal mole ratio.

EXAMPLE 3

Three true solid/solid solution photoactive semiconductor mixed metal oxide materials for $SrTi_{1-x}Rh_xO_3$, with varying volumes of x as shown in Table 3, were prepared following the procedure of Example 2. These three n-type materials were then comminuted to approximately 10 to 50μ particle size powder with an agate mortor and pestal and tested for their light absorption edge using a Gilford Industries Photoacoustic Spectrometer. The samples were scanned from 350 nanometers to 2500 nanometers using a Xenon arc source and a ZnSe standard reference. The shift of the absorption edge with change in the amount of rhodium present is shown in FIG. 4. The absorption edge data for $SrTiO_3$ was normalized from data in "Fundamental Absorption Edge of $SrTiO_3$," Redfield, D. and Burke, William J.; Physical Review B, Vol. 6, No. 8, Oct. 15, 1972.

TABLE 3

| Sample No. | Ti (%) | Rh (%) |
|---|---|---|
| 3a | 80 | 20 |
| 3b | 90 | 10 |
| 3c | 96 | 4 |

FIG. 3 graphically illustrates the average absorption edge shift (in nanometers) with changing Rh concentration. This data is presented for both 50 percent absorption and for 95 percent absorption. The bracketed value on the 50 percent absorption curve is an extrapolated value. The average absorption edge shift is represented by the curve created by plotting the percent Rh (based on the metal moles fraction of Rh in M of the formula $A_R{}^{va}M_y{}^{vm}O_z{}^{-2}$) versus the wavelength of the absorption edge (in nanometers).

EXAMPLE 4

A true solid/solid solution photoactive semiconductor mixed metal oxide material of the form $SrTi_{.86}Ru_{.14}O_3$ was prepared following the procedure of Example 1. This material was mixed with 1 percent Ta (as the alkoxide), pressed into a disc and heated following the procedure of Example 2. The photocurrent (A/m²) of this disc was determined from 350 nanometers to 750 nanometers. The values were determined by sequentially placing a series of sharp-cut, long pass, glass, 2"×2" filters, supplied by the Schott Glass Co., between the Xenon arc light source and the true solid/solid solution photoactive material to change the spectral output of this Xenon arc llight source. This resulted in changing the spectral output of this Xenon arc light source from one which closely approximates the solar spectrum to one which contains only infrared wavelengths. The photocurrent (mA/cm$^2$) was measured with each separate filter in the series between said source and said photoactive material. The testing was done on an optical bench using a solar cell made up of: (1) n-type electrode of $SrTi_{.86}Ru_{.14}O_3$ material in the form of a pellet; (2) a graphite counter electrode; (3) a graphite container and (4) an electrolyte consisting of an aqueous 1 molar KCl solution.

The results of photocurrent change with changing wavelength (A/cm$^2$ vs. mm) are compared graphically in FIG. 5. A normalized spectral response curve for $SrTiO_3$ taken from data in "Fundamental Absorption Edge of $SrTiO_3$," Redfield D. and Burke, William J.; Physical Review B, Vol. 6, No. 8, Oct. 15, 1972 is also presented.

What is claimed is:

1. A photoactive true solid/solid solution semiconductor mixed metal material having a band gap of about 1.4 eV containing metal components all of which are derived from precursor substances selected from the group consisting of elemental metals, non-oxide metal compounds, and mixtures thereof; said mixed metal oxide material corresponding to the formula $A_r^{va}M_y^{v-m}O_z^{-2}$; where said formula represents the stoichiometry of the basic repeating unit lattice cell; where M is the combination of component (a) metal and component (b) metal; A when present is at least one different metal which does not substantially alter the optical absorption accruing from M in the above formula; O represents oxygen, said formula being further characterized in the r, y, z, va and vm are defined by the relationship $va(r)+vm(y)=2z$, wherein r equals a value of from 0 to 2, inclusive, y is from 1 to 2, inclusive, z is from 1 to 7, inclusive, va equals the positive valence of A, vm equals the positive mean valence of M and the valence of oxygen is $-2$; and wherein all said metal components of said formula are selected from the group consisting of boron, aluminum, tin, lead, the transition metals of families 1b through 7b, inclusive, and 8 of the periodic table of elements, and the lanthanide series; wherein M in the above formula comprises:
 (a) 50 to 99.9 mole percent, based on the total metals mole fraction, of one or more component (a) metals; and
 (b) 0.1 to 50 mole percent, based on the total metals mole fraction, of one or more component (b) metals; with the proviso that said component (b) metals arwe different than said component (a) metals, and with the further proviso that said component (a) metals, when in comparable oxide form, have a larger band gap than said component (b) metals, when said component (b) metals are in their comparable oxide form.

2. A photoactive true solid/solid solution semiconductor mixed metal oxide material having a band gap of about 1.4 eV containing metal components all of which are derived from precursor substances selected from the group consisting of elemental metals, non-oxide metal compounds, and mixtures thereof; said mixed metal oxide material corresponding to the formula $A_r^{va}M_y^{v-m}O_z^{-2}$; where said formula represents the stoichiometry of the basic repeating unit lattice cell; where M is the combination of component (a) metal and component (b) metal; A when present is at least one different metal which does not substantially alter the optical absorption accruing from M in the above formula; O represents oxygen, said formula being further characterized in that r, y, z, va and vm are defined by the relationship $va(r)+vm(y)=2z$, wherein r equals a value of from 0 to 2, inclusive, y is from 1 to 2, inclusive, z is from 1 to 7, inclusive, va equals the positive valence of A, vm equals the positive mean valence of M and the valence of oxygen is $-2$; and wherein all said component (b) metals of M of said formula are selected from the group consisting of manganese, iron, cobalt, ruthenium, rhodium, chromium, vanadium, iridium, platinum and combinations thereof; wherein M in the above formula comprises:
 (a) 50 to 99.9 mole percent, based on the total metals mole fraction, of one or more component (a) metals; and
 (b) 0.1 to 50 mole percent, based on the total metals mole fraction, of one or more component (b) metals; with the proviso that said component (b) metals are different than said component (a) metal, and with the further proviso that said component (a) metals, when in comparable oxide form, have a larger band gap than said component (b) metals, when said component (b) metals are in their comparable oxide form.

3. A photoactive semiconductor mixed metal oxide material as claimed in claims 1 or 2 wherein component (a) is from a titanium compound precursor.

4. A photoactive semiconductor mixed metal oxide material as claimed in claims 1 or 2 wherein component (a) is from a tin metal compound precursor.

5. A photoactive semiconductor mixed metal oxide material as claimed in claims 1 or 2 wherein for said formula, r is 0, y is 1, z is 2 and the final mixed metal oxide corresponds to the formula $MO_2$.

6. A photoactive semiconductor mixed metal oxide material as claimed in claims 1 or 2 wherein for said formula, r is 1, y is 1, z is 3 and the final mixed metal oxide compound corresponds to the formula $AMO_3$.

7. A photoactive semiconductor mixed metal oxide material as claimed in claims 1 or 2 wherein for said formula, r is 2, y is 2, z is 7 and the final mixed metal oxide compound corresponds to the formula $A_2M_2O_7$.

8. A photoactive semiconductor mixed metal oxide material as claimed in claims 1 or 2 wherein for said formula, r is 0, y is 2, z is 3 and the final mixed metal oxide compound corresponds to the formula $M_2O_3$.

9. A photoactive semiconductor mixed metal oxide material as claimed in claims 1 or 2 wherein for said formula, r is 0, y is 1, z is 1 and the final mixed metal oxide compound corresponds to the formula MO.

10. A photoactive semiconductor mixed metal oxide material as claimed in claims 1 or 2 wherein for said formula A is a single metal.

11. A photoactive semiconductor mixed metal oxide material as claimed in claims 1 or 2 wherein for said formula A is a single metal selected from the group consisting of strontium, zinc and the lanthanides.

12. A photoactive semiconductor mixed metal oxide material as claimed in claims 1 or 2 wherein for said formula A is a combination of from 2 to 3 different metals.

13. A photoactive semiconductor mixed metal oxide material as claimed in claims 1 or 2 wherein for said formula A is a combination of from 2 to 3 different metals selected from the group consisting of strontium, zinc and the lanthanides.

14. A photoactive semiconductor mixed metal oxide material as claimed in claims 1 or 2 wherein for said formula M is a combination of 2 different metals.

15. A photoactive semiconductor mixed metal oxide material as claimed in claim 1 wherein for said formula M is a combination of 2 different metals selected from the group consisting of boron, aluminum, tin, lead, the lanthanide series and the transition metals.

16. A photoactive semiconductor mixed metal oxide material as claimed in claims 1 or 2 wherein for said formula M is a combination of titanium and a metal selected from the group consisting of Rh, Ru, Ir, Mn, Cr, Fe, V and Pt.

17. A photoactive semiconductor mixed metal oxide material as claimed in claims 1 or 2 wherein for said formula M is a combination of aluminum and a metal selected from the group consisting of Rh, Ru, Ir, Mn, Cr, Fe, V and Pt.

18. A photoactive semiconductor mixed metal oxide material as claimed in claims 1 or 2 wherein for said formula M is a combination of Ru or Rh and one metal selected from the group consisting of niobium, lanthanum, tantalum, tin, titanium and zirconium.

19. A photoactive semiconductor mixed metal oxide material as claimed in claims 1 or 2 wherein for said formula M is a combination of 3 to 4 different metals characterized in that one metal is selected from the group Al, Nb, La, Ta, Sn, Ti and Zr and the remaining different metals are selected from the group consisting of Ir, Mn, Cr, Fe, V, Pt, Rh and Ru.

20. A photoactive semiconductor mixed metal oxide material as claimed in claims 1 or 2 wherein the component (a) metal is titanium and amounts to 90 to 99 mole percent of the total metals mole fraction of M, and the component (b) metal is selected from the group consisting of ruthenium, iron, manganese, platinum and iridium and amounts to 1 to 10 mole percent of the total metals mole fraction M.

21. A photoactive semiconductor mixed metal oxide material as claimed in claims 1 or 2 wherein the component (a) metal is titanium and amounts to 90 to 99 mole percent of the total metals mole fraction of M, and the component (b) metal is rhodium and amounts to 1 to 10 mole percent of the total metals mole fraction of M.

22. A process for the production of a true solid/solid solution photoactive semiconductor mixed metal oxide material comprising:
(I) dissolving at least 2 different non-oxide metal ion precursors in a liquid solvent thereby producing a solution;
(II) separating said liquid solvent from said solution of step (I) by separation means leaving an intimately blended solid in non-oxide form; and
(III) converting said intimately blended solid of step (II) to a true solid/solid solution mixed metal oxide by firing; thereby, upon cooling, producing said photoactive semiconductor mixed metal oxide material.

23. A process as claimed in claim 22 wherein step (I) is carried out in stages, characterized in that each non-oxide metal ion precursor is independently dissolved in a separate liquid solvent and the resulting solutions are then intimately mixed together.

24. A process as claimed in claims 22 or 23 wherein said true solid/solid solution photoactive semiconductor mixed metal oxide material is comminuted thereby producing a powder.

25. The process of claim 24 wherein said true solid/solid solution photoactive semiconductor mixed metal oxide material is allowed to cool before comminuting to a powder.

26. The process of claim 24 wherein said powder has a particle size of from 0.1 to 200 microns.

27. The process of claim 22 wherein said non-oxide metal ion precursor is elemental metal and said liquid solvent comprises inorganic acid in a liquid medium.

28. The process of claim 27 wherein said liquid solvent comprises inorganic acid selected from the group consisting of mineral acids, acetic acid and combinations thereof in a liquid medium selected from the group consisting of water, polar solvents and combinations thereof.

29. The process of claim 22 wherein said non-oxide metal ion precursor is a non-oxide metal salt and said liquid solvent comprises a liquid in which said non-oxide metal salt is soluble.

30. The process of claim 22 wherein said non-oxide metal ion precursor is a non-oxide organometallic compound and said liquid solvent comprises a liquid in which said non-oxide organometallic compound is soluble.

* * * * *

UNITED STATES PATENT AND TRADEMARK OFFICE
CERTIFICATE OF CORRECTION

PATENT NO. : 4,419,278
DATED : December 6, 1983
INVENTOR(S) : Arnold Z. Gordon

It is certified that error appears in the above-identified patent and that said Letters Patent are hereby corrected as shown below:

Column 13, lines 27 and 28, delete "$A_r{}^{va}M_y{}^v{}_m O_z{}^{-2}$" and insert --$A_r{}^{va}M_y{}^{vm}O_z{}^{-2}$--.

Column 13, line 51, delete "arwe" and insert --are--.

Column 13, lines 63 and 64, delete "$A_r{}^{va}M_y{}^v{}_m O_z{}^{-2}$" and insert --$A_r{}^{va}M_y{}^{vm}O_z{}^{-2}$--.

In the ABSTRACT, line 9, delete "thepart" and insert --the part--.

Signed and Sealed this

Sixth Day of March 1984

[SEAL]

Attest:

GERALD J. MOSSINGHOFF

Attesting Officer   Commissioner of Patents and Trademarks